(12) United States Patent
Kiwaki

(10) Patent No.: US 9,688,101 B2
(45) Date of Patent: Jun. 27, 2017

(54) TIRE

(75) Inventor: Yukihiro Kiwaki, Higashimurayama (JP)

(73) Assignee: BRIDGESTONE CORPORATION, Tokyo (JP)

(*) Notice: Subject to any disclaimer, the term of this patent is extended or adjusted under 35 U.S.C. 154(b) by 636 days.

(21) Appl. No.: 14/236,702

(22) PCT Filed: Jul. 31, 2012

(86) PCT No.: PCT/JP2012/069472
§ 371 (c)(1),
(2), (4) Date: Feb. 18, 2014

(87) PCT Pub. No.: WO2013/018800
PCT Pub. Date: Feb. 7, 2013

(65) Prior Publication Data
US 2014/0166170 A1 Jun. 19, 2014

(30) Foreign Application Priority Data
Aug. 4, 2011 (JP) ................. 2011-171170

(51) Int. Cl.
*B60C 11/01* (2006.01)
*B60C 13/00* (2006.01)
*B60C 11/13* (2006.01)

(52) U.S. Cl.
CPC ............ *B60C 11/01* (2013.01); *B60C 13/001* (2013.04); *B60C 2011/1361* (2013.04)

(58) Field of Classification Search
CPC B60C 11/01; B60C 13/001; B60C 2011/1361
USPC .................... 152/209.16, 209.21
See application file for complete search history.

(56) References Cited

U.S. PATENT DOCUMENTS 4,423,760 A * 1/1984 Treves ............... B60C 11/042
152/209.21

FOREIGN PATENT DOCUMENTS

| JP | 2008-24048 A | 2/2008 |
| JP | 2009-298184 A | 12/2009 |
| WO | 2011/024492 A1 | 3/2011 |

OTHER PUBLICATIONS

International Search Report for PCT/JP2012/069472 dated Oct. 9, 2012.

* cited by examiner

*Primary Examiner* — Seyed Masoud Malekzadeh
(74) *Attorney, Agent, or Firm* — Sughrue Mion, PLLC

(57) ABSTRACT

This tire has a buttress section to which a plurality of depressions (100) have been formed along the tire peripheral direction ($D_C$). The depressions (100) have: a first outer edge (110) that bulges inward in the tread width direction ($D_T$); and a second outer edge (120) that is continuous with the first outer edge (110) and that bulges outward in the tread width direction ($D_T$) with respect to the first outer edge (110). The distance between the deepest section (150) of the depressions (100) and the ground-contact end of the tread varies along the tire peripheral direction ($D_C$).

8 Claims, 7 Drawing Sheets

TIRE

CROSS REFERENCE TO RELATED APPLICATIONS

This application is a National Stage of International Application No. PCT/JP2012/069472 filed Jul. 31, 2012, claiming priority based on Japanese Patent Application No. 2011-171170 filed Aug. 4, 2011, the contents of all of which are incorporated herein by reference in their entirety.

TECHNICAL FIELD

The present invention relates to a tire having a plurality of recessed portions formed on a buttress portion along a tire circumferential direction.

BACKGROUND ART

Conventionally, in a tire mounted on a vehicle such as a passenger vehicle, various methods have been used to reduce tire noise generated when the tire rolls on a road surface having irregular recesses and bumps, such as a paved road with a rough road surface. For example, there is known a tire using rubber with high stiffness in the shoulder portion of a tread (refer to Patent Literature 1). According to such a tire, deformation of the tread can be suppressed when the bumps, of the recesses and bumps of the road surface, wedge into the tread. Due to this, the increase of the contact pressure of the tread is suppressed, and the increase of tire noise when the tire rolls on a rough road surface can be suppressed.

Incidentally, nowadays, as a result of progress in the intensive study on the mechanism of tire noise generated, it has been made clear that the vibration of the buttress portion due to recesses and bumps of the road surface is also a cause of tire noise. In other words, when the road surface is smooth, normally, the buttress portion does not contact the road surface. On the other hand, when there are small recesses and bumps on the road surface, such as a paved road with a rough road surface, the buttress portion does contact the road surface, and due to these recesses and bumps, the buttress portion vibrates. Vibration of the buttress portion like this increases tire noise. In order to suppress the generation of such tire noise, it is considered to form small recessed portions on the buttress portion. However, there is a problem that, when such small recessed portions are formed on the buttress portion that is severely deformed, cracks originating from the recessed portions easily progress.

CITATION LIST

Patent Literature

[Patent Literature 1] Japanese Patent Application Publication No. 2008-24048.

SUMMARY OF INVENTION

A first feature is summarized as a tire comprising: a tread that contacts a road surface; a side wall provided on an inner side of the tread in the tire radial direction; and a buttress portion provided between the tread and the side wall, wherein a plurality of recessed portions are formed on the buttress portion along a tire circumferential direction, each of the recessed portions has: a first outer edge that bulges inward in a tread widthwise direction; and a second outer edge that continues to the first outer edge and bulges outward in the tread widthwise direction with respect to the first outer edge, and the distance between a deepest portion of the recessed portion and a grounding end of the tread varies as proceeding along the tire circumferential direction.

DESCRIPTION OF EMBODIMENTS

Figure 1:
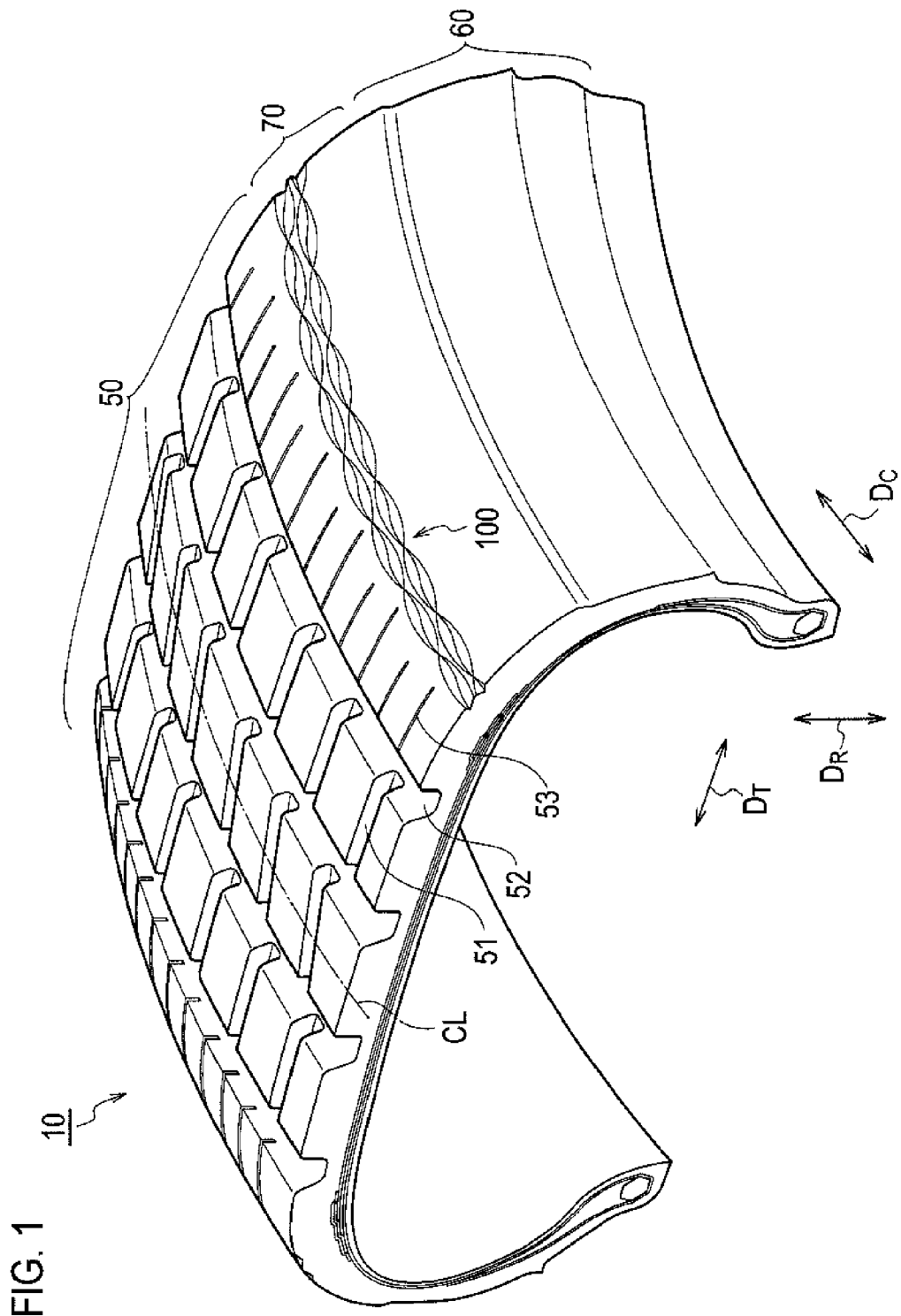
FIG. 1 is a perspective view of a part of a segmented pneumatic tire 10 according to an embodiment.

Next, an embodiment of a tire (a pneumatic tire) according to the present invention is described with reference to drawings. It is noted that, in the following description of the drawings, the same or similar reference numerals are used to designate the same or similar portions. It should be appreciated that the drawings are schematically shown and the ratio and the like of each dimension are different from the real ones.

Accordingly, specific dimensions and the like should be determined in consideration of the explanation below. Further, among the drawings, the respective dimensional relations or ratios may differ.

(1) Schematic Configuration of Pneumatic Tire

FIG. 1 is a perspective view of a part of a segmented pneumatic tire 10. As shown in FIG. 1, the pneumatic tire 10 is provided with a tread 50 which contacts the road surface, a side wall 60 provided on the inner side, in a tire radial direction $D_R$, of the tread 50, and a buttress portion 70 provided between the tread 50 and the side wall 60. It is noted that the pneumatic tire 10 may be filled with, instead of air, an inert gas such as nitrogen gas. The tread 50 is configured by a plurality of land blocks 51, a plurality of circumferential grooves 52, and a shoulder land portion 53. Further, a plurality of recessed portions 100 are formed on the buttress portion 70 along a tire circumferential direction $D_C$.

(2) Shape of Recessed Portion 100

Next, the shape of each recessed portion 100 formed on the buttress portion 70 will be described. Specifically, description will be given for the schematic shape and the cross-sectional shape of the recessed portion 100.

(2.1) Schematic Shape of Recessed Portion 100

Figure 2:
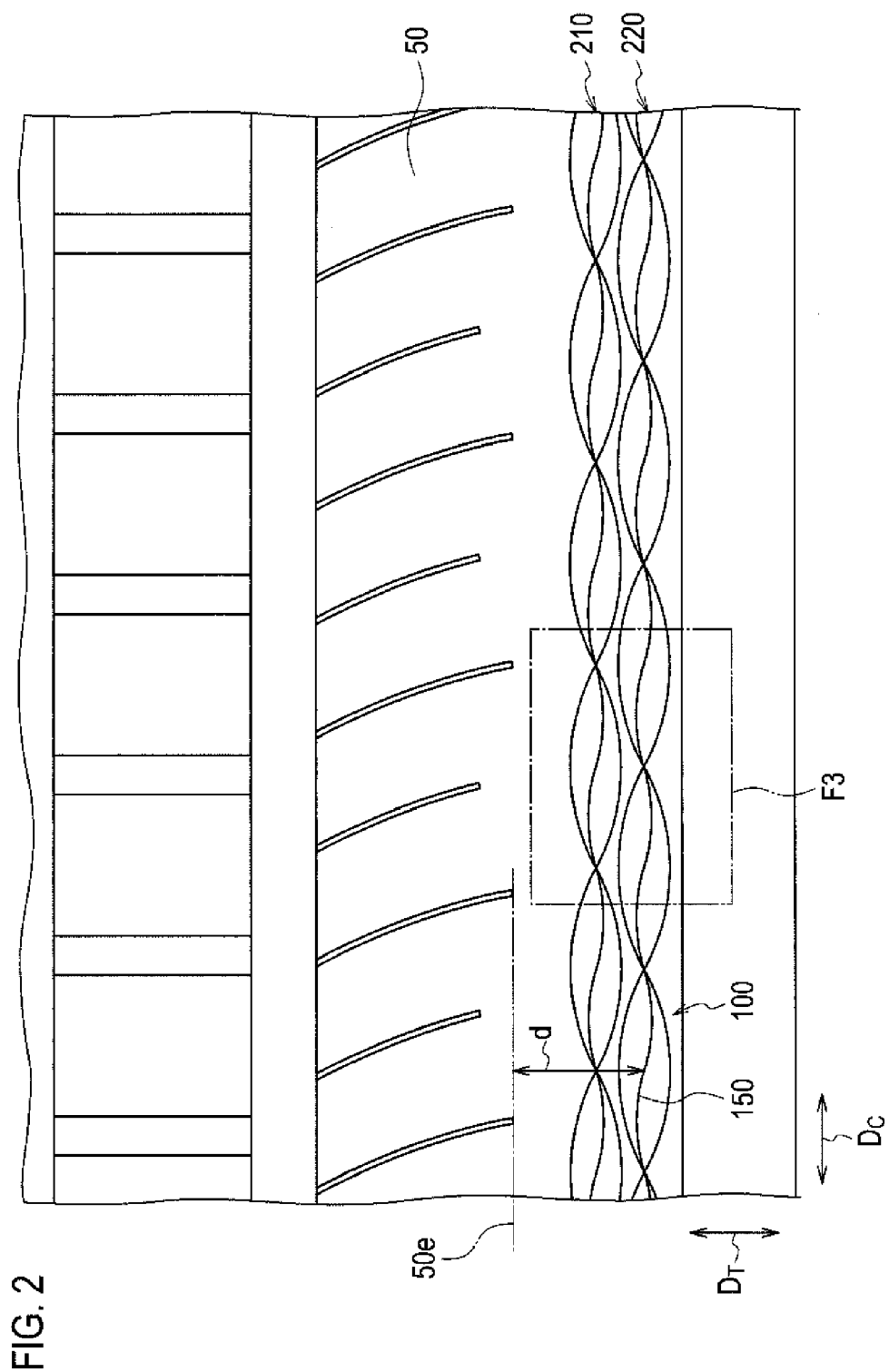
FIG. 2 is a view schematically showing a first recessed row 210 and 220 configured by recessed portions 100 according to the embodiment.
Figure 3:
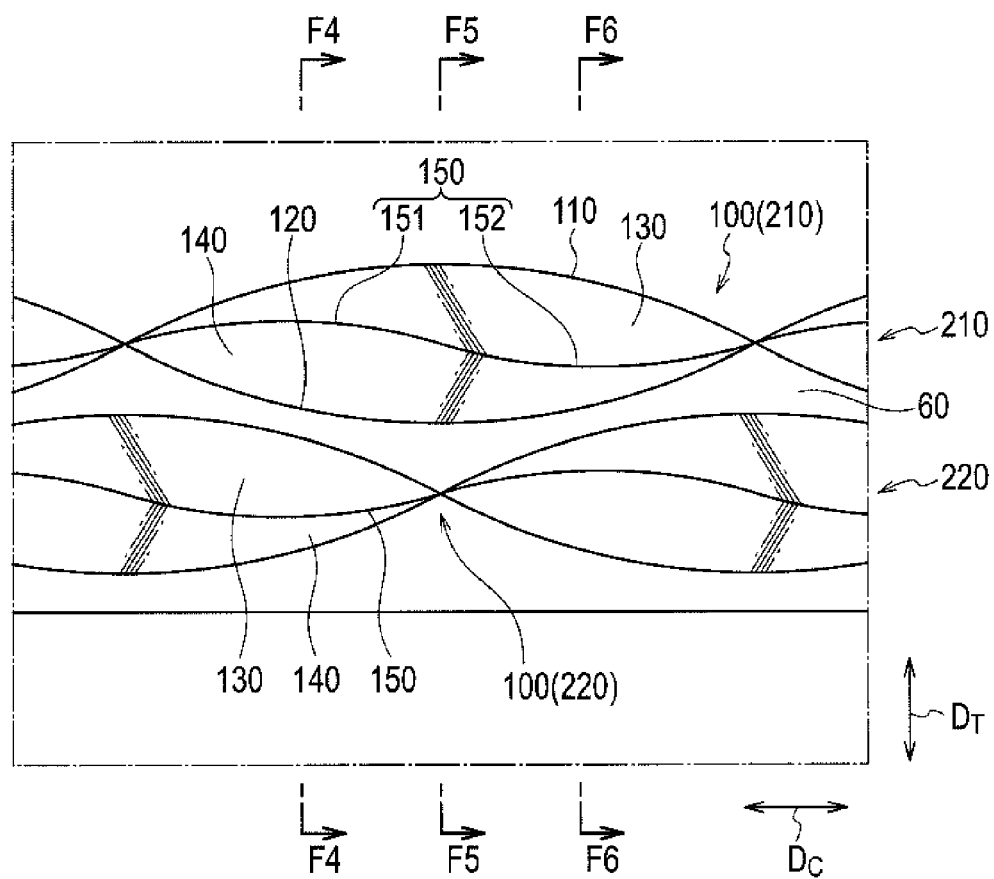
FIG. 3 is an enlarged view of the recessed portions 100 within an F3 frame shown in FIG. 2.

FIG. 2 is a view schematically showing a first recessed row 210 and a second recessed row 220 configured by the recessed portions 100. FIG. 3 is an enlarged view of the recessed portions 100 within an F3 frame shown in FIG. 2.

As shown in FIG. 2, the recessed portion 100 is in an elliptical shape and a plurality of the recessed portions 100 continue in the tire circumferential direction $D_C$. In the present embodiment, the first recessed row 210 configured by the plurality of recessed portions 100 formed along the tire circumferential direction $D_C$, and the second recessed row 220 configured by the plurality of recessed portions 100 formed along the tire circumferential direction $D_C$ and disposed outside the first recessed row 210 in the tread widthwise direction $D_T$, are provided.

A distance d between a deepest portion 150 of the recessed portion 100 and a grounding end 50e of the tread 50 (specifically, the shoulder land portion 53) varies in the tire circumferential direction $D_C$. That is, the distance d varies as proceeding along the tire circumferential direction $D_C$, and the variation in the distance d is repeated with the recessed portion 100 as a unit.

Further, the deepest portion 150 of the recessed portion 100 is curved in side view of the pneumatic tire 10. It is noted that the grounding end 50e means an outer end in the tread widthwise direction $D_T$ on the ground contact surface of the tread 50 in a state where a normal load is applied to the pneumatic tire 10 set to have a normal internal pressure regulated by the Japan Automobile Tire Manufacturers Association (JATMA) and the like.

(2.2) Cross-Sectional Shape of Recessed Portion 100

Figure 4:
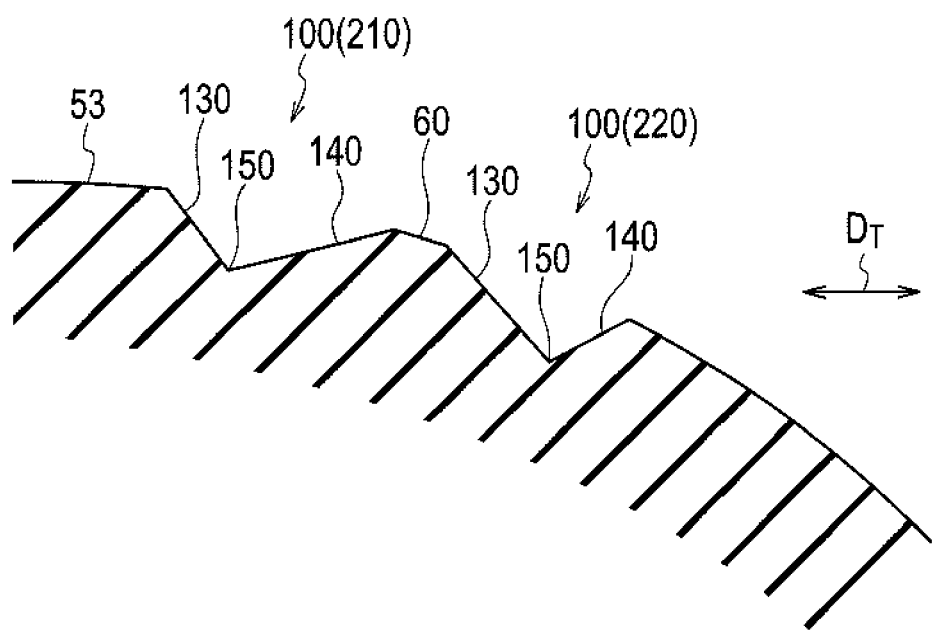
FIG. 4 is a sectional view of a buttress portion 70, which is taken along a line F4-F4 shown in FIG. 3.
Figure 5:
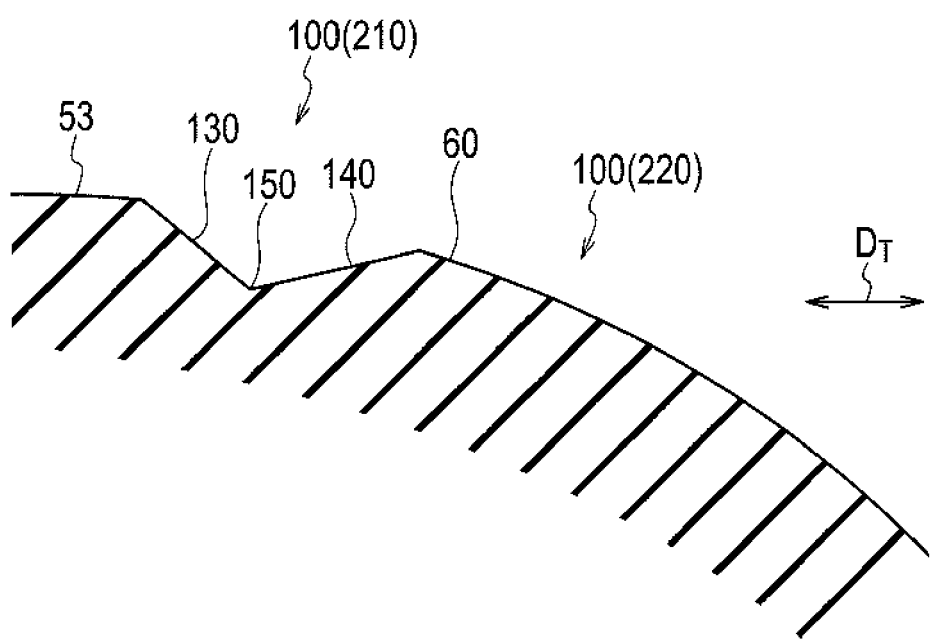
FIG. 5 is a sectional view of the buttress portion 70, which is taken along a line F5-F5 shown in FIG. 3.
Figure 6:
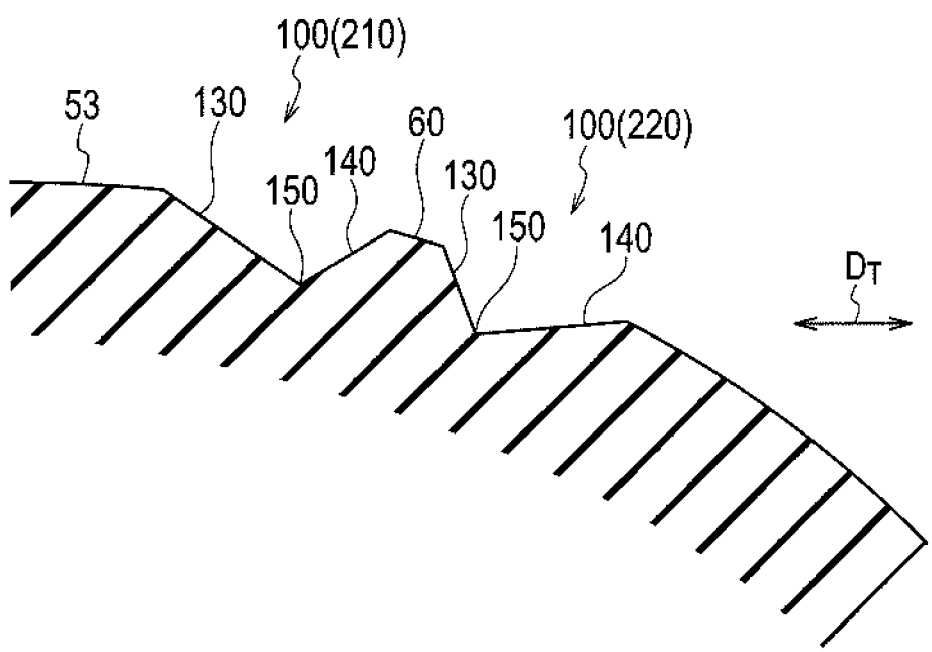
FIG. 6 is a sectional view of the buttress portion 70, which is taken along a line F6-F6 shown in FIG. 3.

FIG. 4 is a sectional view of the buttress portion 70, which is taken along a line F4-F4 shown in FIG. 3. FIG. 5 is a sectional view of the buttress portion 70, which is taken along a line F5-F5 shown in FIG. 3. FIG. 6 is a sectional view of the buttress portion 70, which is taken along a line F6-F6 shown in FIG. 3.

As shown in FIG. 4 to FIG. 6, the recessed portion 100 has a first outer edge 110 that bulges inward in the tread widthwise direction $D_T$. Further, the recessed portion 100 has a second outer edge 120 that is continuous with the first outer edge 110 and that bulges outward in the tread widthwise direction $D_T$ with respect to the first outer edge 110.

In the present embodiment, the first outer edge 110 is in an arc-like shape that is curved so as to bulge inward in the tread widthwise direction $D_T$. Similarly, the second outer edge 120 is in an arc-like shape that is curved to bulge outward in the tread widthwise direction $D_T$ with respect to the first outer edge 110. That is, the recessed portion 100 is in an elliptical shape. Further, the recessed portion 100 has a first bottom surface 130 that extends from the first outer edge 110 to the deepest portion 150 and a second bottom surface 140 that extends from the second outer edge 120 to the deepest portion 150. The first bottom surface 130 is formed so as to be point-symmetrical to the second bottom surface 140.

Further, in the present embodiment, the recessed portion 100 included in the second recessed row 220 is formed between the two recessed portions 100 adjacent to each other in the tire circumferential direction $D_C$ included in the first recessed row 210. The deepest portion 150 has a first curved portion 151 that is curved so as to be closer to the first outer edge 110 in side view (viewpoint from the side wall 60) of the pneumatic tire 10 and a second curved portion 152 that continues to the first curved portion 151 and is curved so as to be closer to the second outer edge 120 in side view of the pneumatic tire 10.

Further, as described above, the distance d between the deepest portion 150 and the grounding end 50e of the tread 50 varies in the tread widthwise direction $D_T$ (see FIG. 2). Therefore, as shown in FIG. 4 to FIG. 6, the position of the deepest portion 150 in the tread widthwise direction $D_T$ varies as proceeding along the tire circumferential direction $D_C$. Specifically, positions, in the tread widthwise direction $D_T$, of the deepest portion 150 of the recessed portion 100 that forms the first recessed row 210 and the deepest portion 150 of the recessed portion 100 that forms the second recessed row 220 vary, respectively, in the tire circumferential direction $D_C$. Further, the distance between the deepest portion 150 and the first outer edge 110 and the distance between the deepest portion 150 and the second outer edge 120 also vary in the tire circumferential direction Dc.

(3) Advantageous Effect

According to the pneumatic tire 10, the plurality of recessed portions 100 formed along the tire circumferential direction have the first outer edge 110 that bulges inward in the tread widthwise direction $D_T$, and the second outer edge 120 that continues to the first outer edge 110 and bulges outward in the tread widthwise direction $D_T$ with respect to the first outer edge 110. Further, the distance d between the deepest portion 150 of the recessed portion 100 and the grounding end 50e of the tread 50 varies in the tire circumferential direction $D_C$.

In general, a buttress portion does not contact a smooth road surface, but contacts a road surface with small recesses and bumps, such as a paved road with a rough road surface. Due to such recesses and bumps, the buttress portion vibrates, and road noise resulting from the vibration of the buttress portion is increased. However, in the embodiment, the recessed portion 100 is formed on the buttress portion and the distance d between the deepest portion 150 of the recessed portion 100 and the grounding end 50e of the tread 50 varies in the tire circumferential direction $D_C$, thus it is possible to suppress the road noise resulting from the vibration of the buttress portion.

Further, the distance d between the deepest portion 150 of the recessed portion 100 and the grounding end 50e of the tread 50 varies in the tread widthwise direction $D_T$, thus the progression of cracks resulting from the shape of the recessed portions 100 along the tire circumferential direction $D_C$ is suppressed.

That is, according to the pneumatic tire 10, it is possible to suppress, by the recessed portion 100 formed on the buttress portion 70, the generation of tire noise resulting from a vibration of the buttress portion 70 and progression of cracks originating from the recessed portions 100.

Further, since the distance d between the deepest portion 150 of the recessed portion 100 and the grounding end 50e of the tread 50 varies in the tire circumferential direction $D_C$, curvature itself is suppressed, and generation of cracks is suppressed. Further, even when cracks are generated, progression of cracks is suppressed.

In the present embodiment, the first outer edge 110 and the second outer edge 120 are in an arc-like shape, and the deepest portion 150 is curved in the pneumatic tire 10. Further, the recessed portion 100 has a first bottom surface 130 that extends from the first outer edge 110 to the deepest portion 150 and a second bottom surface 140 that extends from the second outer edge 120 to the deepest portion 150. Thus, progression of cracks resulting from the shape of the recessed portion 100 along the tire circumferential direction $D_C$ is further suppressed.

In the present embodiment, the deepest portion 150 has the first curved portion 151 that is curved so as to be closer to the first outer edge 110 and the second curved portion 152 that continues to the first curved portion 151 and is curved so as to be closer to the second outer edge 120. Further, the first bottom surface 130 is formed so as to be point-symmetrical to the second bottom surface 140. Therefore, progression of cracks in the recessed portion 100 can be suppressed.

In the present embodiment, the first recessed row 210 and the second recessed row 220 are formed and the recessed portion 100 included in the second recessed row 220 is formed between the two recessed portions 100 adjacent to each other in the tire circumferential direction $D_C$ included in the first recessed row 210. Therefore, vibration resulting from contact of the buttress portion 70 with the road surface is effectively reduced and progression of cracks resulting from the shape of the recessed portions 100 along the tire circumferential direction $D_C$ is suppressed.

(4) Other Embodiments

Figure 7:
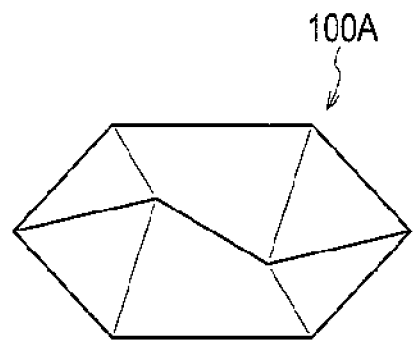
FIGS. 7(a)-7(c) are views showing a shape of a recess according to modifications.
Figure 7:
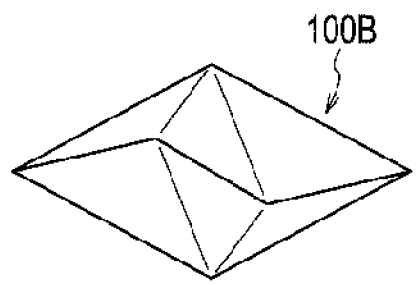
Figure 7:
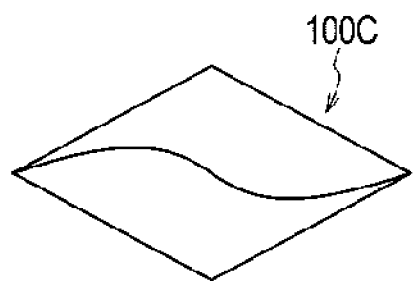

As described above, the contents of the present invention are disclosed through the embodiment of the present invention. However, it should not be interpreted that the statements and drawings constituting a part of this disclosure limit the present invention. From this disclosure, a variety of alternate embodiments, examples, and applicable techniques will become apparent to one skilled in the art. For example, the shape of the recessed portion 100 may not necessarily be in an elliptical shape as described in the above-described embodiment. FIGS. 7(*a*) to (*c*) are views showing shapes of recessed portion according to modifications of the present invention. As shown in FIGS. 7(*a*) to (*c*), a recess formed on the buttress portion 70 may be a polygonal recessed portion 100A as shown in FIG. 7(*a*). Alternatively, as shown in FIGS. 7(*b*) and (*c*), the recessed portion may be rhomboidal recessed portions 100B and 100C. Further, the shape of the deepest portion of the recess may be a combination of straight lines like the recessed portion 100B or in a curved shape like the recessed portion 100C.

As described above, needless to say, the present invention includes various embodiments and the like not described here. Therefore, the technical range of the present invention is to be defined only by the inventive specific matter according to the adequate claims from the above description.

In addition, the entire content of Japanese Patent Application No. 2011-171170 (filed on Aug. 4, 2011) is incorporated in the present specification by reference.

INDUSTRIAL APPLICABILITY

According to a characteristic of the present invention, it is possible to provide a tire with which it is possible to suppress, by recessed portions formed on a buttress portion, the generation of tire noise resulting from vibration of the buttress portion and the progression of cracks originating from the recessed portions.

The invention claimed is:

1. A tire comprising:
   a tread that contacts a road surface;
   a sidewall provided on an inner side of the tread in a tire radial direction; and
   a buttress portion provided between the tread and the sidewall, wherein
   a plurality of recessed portions are formed on the buttress portion along a tire circumferential direction,
   each of the recessed portions has:
      a first outer edge that bulges inward in a tread widthwise direction; and
      a second outer edge that continues to the first outer edge and bulges outward in the tread widthwise direction with respect to the first outer edge,
   wherein the first outer edge is arc shaped and curved so as to bulge inward in the tread widthwise direction,
   the second outer edge is arc shaped and curved so as to bulge outward in the tread widthwise direction with respect to the first outer edge,
   a distance between a deepest portion of each of the recessed portions and a grounding end of the tread varies as proceeding along a tire circumferential direction,
   each of the recessed portions is in an elliptical shape and the plurality of the recessed portions continue in the tire circumferential direction, and
   each of the recessed portions is connected next to each other around a whole circumference of tire.

2. The tire according to claim 1, wherein
the deepest portion of each of the recessed portions is curved in a side view of the tire.

3. The tire according to claim 2, wherein
each of the recessed portions comprises:
a first bottom surface that extends from the first outer edge to the deepest portion; and
a second bottom surface that extends from the second outer edge to the deepest portion.

4. The tire according to claim 3, wherein
the first bottom surface is formed so as to be point-symmetrical to the second bottom surface.

5. The tire according to claim 2, wherein
the deepest portion comprises:
a first curved portion that is curved so as to be closer to the first outer edge in the side view of the tire; and
a second curved portion that continues to the first curved portion and is curved so as to be closer to the second outer edge in the side view of the tire.

6. The tire according to claim 1, comprising:
a first recessed row configured by a plurality of the recessed portions formed along the tire circumferential direction, and
a second recessed row configured by a plurality of the recessed portions formed along the tire circumferential direction and disposed outside the first recessed row in the tread widthwise direction.

7. The tire according to claim 6, wherein
a respective recessed portion included in the second recessed row is formed between two recessed portions adjacent to each other in the tire circumferential direction included in the first recessed row.

8. The tire according to claim 1, wherein
the deepest portion of each of the recessed portions is curved in a side view of the tire, and
the deepest portion comprises:
a first curved portion that is curved so as to be closer to the first outer edge in the side view of the tire; and
a second curved portion that continues to the first curved portion and is curved so as to be closer to the second outer edge in the side view of the tire.

\* \* \* \* \*